(12) United States Patent
Hijikata

(10) Patent No.: US 9,120,487 B2
(45) Date of Patent: Sep. 1, 2015

(54) DRIVING FORCE CONTROL APPARATUS OF VEHICLE

(75) Inventor: Kenji Hijikata, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 1555 days.

(21) Appl. No.: 11/802,359

(22) Filed: May 22, 2007

(65) Prior Publication Data
US 2007/0276549 A1 Nov. 29, 2007

(30) Foreign Application Priority Data
May 23, 2006 (JP) ................. 2006-143235

(51) Int. Cl.
*G06F 17/00* (2006.01)
*B60W 30/182* (2012.01)

(52) U.S. Cl.
CPC ..... *B60W 30/182* (2013.01); *B60W 2510/0676* (2013.01)

(58) Field of Classification Search
CPC ............... F16H 2059/082; F16H 2059/085; F16H 2059/084; F16H 2059/083; F16H 2059/086; F16H 2059/003; F16H 2059/0221; F16H 2059/743; F16H 2059/746; F16H 61/0213; F16H 2061/0227; F16H 59/78; F16H 59/74
USPC ...................................... 701/1, 36
See application file for complete search history.

(56) References Cited

U.S. PATENT DOCUMENTS

| 4,564,905 | A | * | 1/1986 | Masuda et al. ........ 701/1 |
|---|---|---|---|---|
| 4,616,618 | A | * | 10/1986 | Blocher et al. ........ 123/478 |
| 4,669,335 | A | * | 6/1987 | Matsuoka et al. ........ 477/129 |
| 5,595,060 | A | * | 1/1997 | Togai et al. ........ 60/274 |
| 5,620,393 | A | * | 4/1997 | Minowa et al. ........ 477/155 |
| 6,275,231 | B1 | * | 8/2001 | Obradovich ........ 345/156 |
| 6,340,014 | B1 | * | 1/2002 | Tomita et al. ........ 123/295 |
| 6,948,989 | B2 | * | 9/2005 | Watabe ........ 440/87 |
| 2001/0023671 | A1 | * | 9/2001 | Vorih ........ 123/90.12 |
| 2002/0039422 | A1 | * | 4/2002 | Daly ........ 381/71.4 |
| 2002/0107107 | A1 | * | 8/2002 | Ogawa et al. ........ 477/111 |
| 2005/0022621 | A1 | * | 2/2005 | Kusano ........ 74/335 |
| 2008/0269970 | A1 | * | 10/2008 | Yamada ........ 701/21 |
| 2009/0088935 | A1 | * | 4/2009 | Kitaori ........ 701/52 |

FOREIGN PATENT DOCUMENTS

JP 5-332236 12/1993

OTHER PUBLICATIONS

JP 2000-087772 Translation.*

* cited by examiner

*Primary Examiner* — John Q Nguyen
*Assistant Examiner* — Kyung Kim
(74) *Attorney, Agent, or Firm* — McGinn IP Law Group, PLLC

(57) ABSTRACT

In a driving force control apparatus of a vehicle of the present invention, a calculation portion of a meter_ECU outputs a mode selected by a mode selection switch or a temporary switch to a calculation portion as a request mode and has a multi-information display 12 display the mode selected by a driver. A calculation portion of an E/G_ECU outputs the request mode to a throttle control calculation portion and a transmission control calculation portion as a control mode for throttle opening-degree control and transmission control of a transmission with a driving force characteristic of the corresponding mode. A control mode arbitration calculation portion forcedly switches the control mode to a normal mode during warming-up driving or when a shift select lever is set to an R range. At this time, display of the request mode is not switched but the mode selected by the driver is displayed.

19 Claims, 12 Drawing Sheets

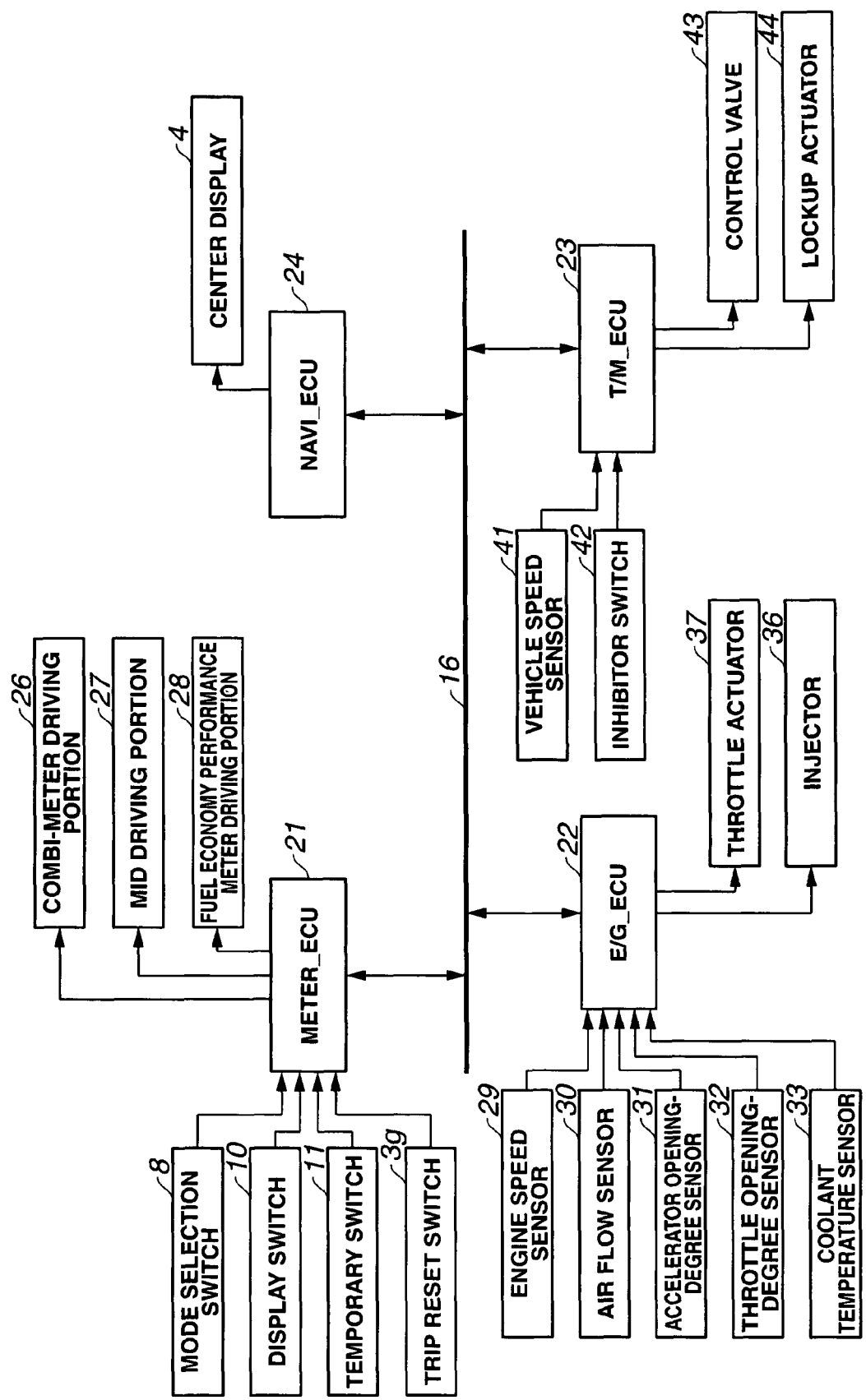

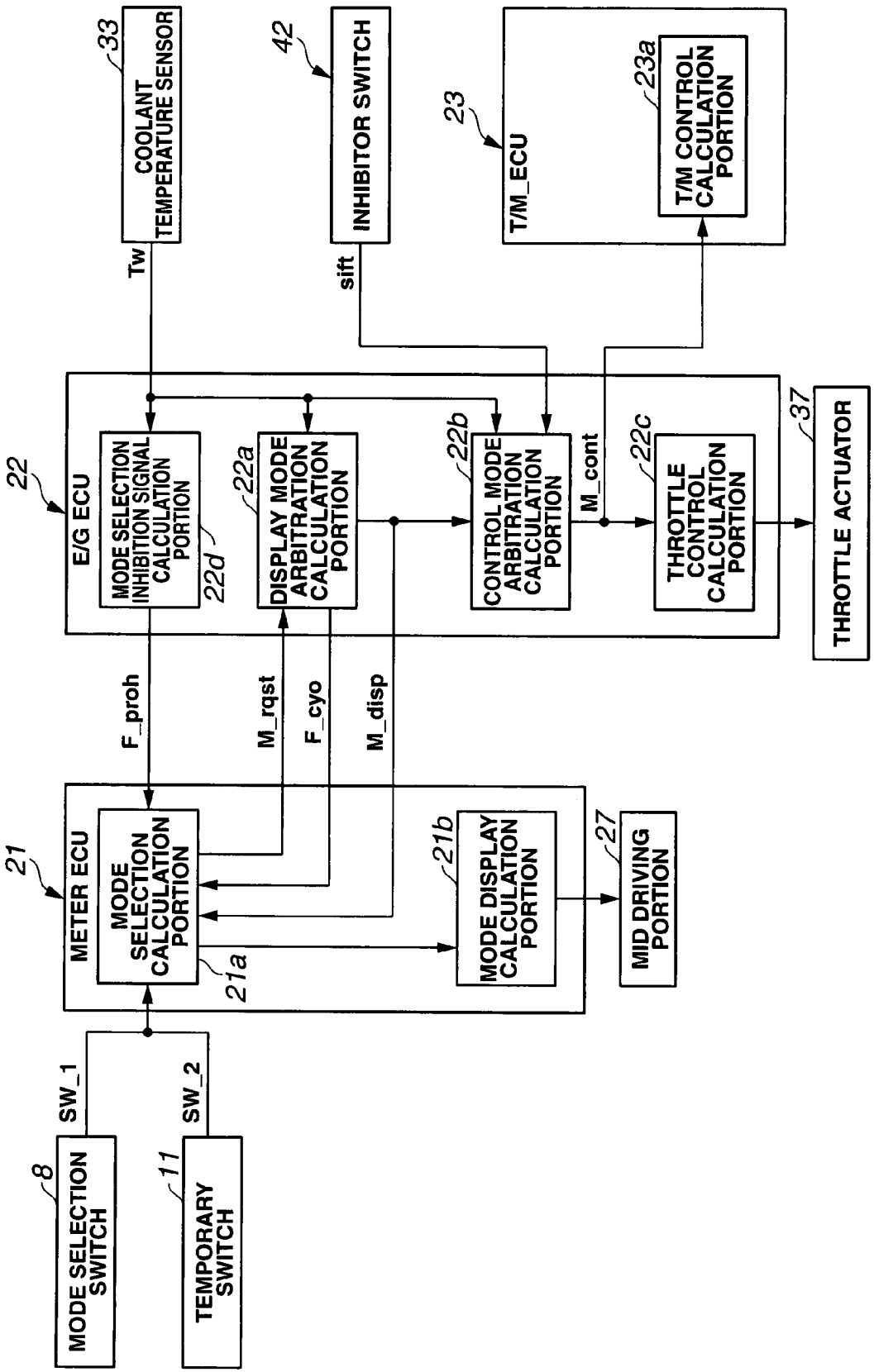

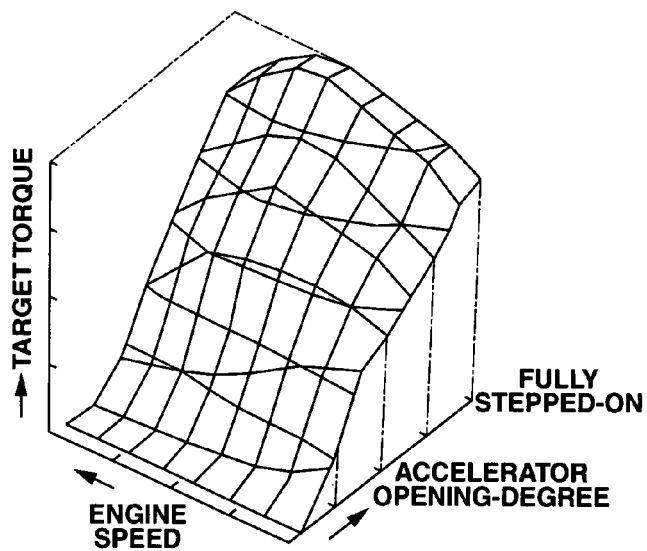
FIG.15A Mp1
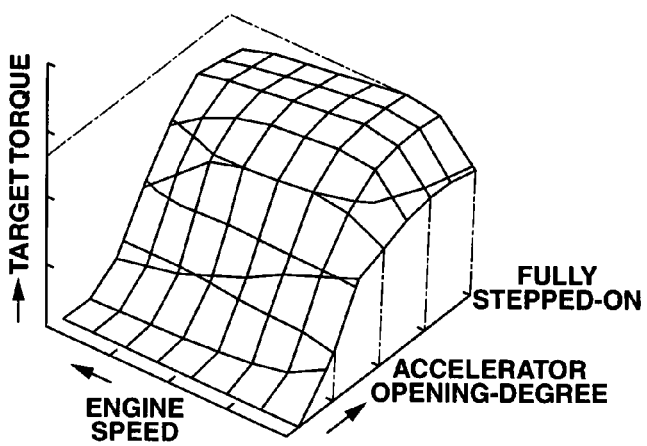
FIG.15B Mp2
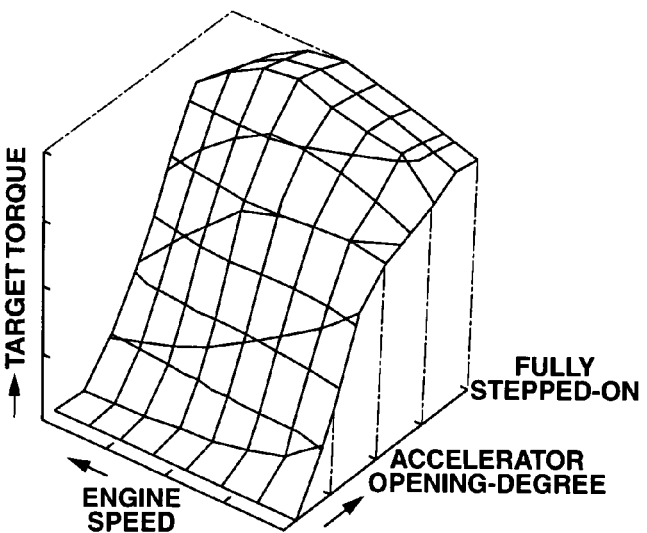
FIG.15C Mp3

DRIVING FORCE CONTROL APPARATUS OF VEHICLE

The disclosure of Japanese Patent Application No. 2006-143235 filed on May 23, 2006 Japan including the specification, drawings and abstract is incorporated herein by reference in its entirety.

BACKGROUND OF THE INVENTION

1. Field of the Invention

The present invention relates to a driving force control apparatus of a vehicle in which a single mode is selected from a plurality of modes having different driving force characteristics by external operation and a driving force instruction value is set according to the driving force characteristic of the selected mode.

2. Description of the Related Art

In a vehicle such as an automobile, it is preferable that fuel economy performance and driving performance (acceleration response) are both favorable in general, but it is difficult to satisfy both in a single vehicle. Therefore, a technology is known that a plurality of control modes such as an economy mode with an emphasis on fuel economy performance and a power mode with an emphasis on output are set in addition to a normal mode and one control mode is selected by operation of a switch or the like by a driver so that both the fuel economy performance and driving performance are satisfied in a single vehicle.

In Japanese Patent Laid-Open Publication No. 5-332236, for example, a technology is disclosed that an air-fuel ratio map and an ignition timing map corresponding to the control mode (either one of the economy mode and the power mode) selected by a driver are selected so that fuel injection control and ignition timing control are carried out based on the selected map.

In the technology disclosed in the above document, when a driver chooses a specific mode, an engine output is controlled according to the mode selected by the driver after the selection till the driver switches the mode to another one.

However, if the driver chooses a mode with an emphasis on output such as a power mode at cold start, there is nonconformity that fuel economy performance and exhaust emission are deteriorated in warm-up driving after the start. Similarly, if a mode with an emphasis on output such as a power mode is selected at reverse driving, there is a problem that fine accelerator control at a low speed is difficult and operability is poor.

As above, even in a vehicle capable of selection from a plurality of modes, there are cases where control of a vehicle based on the mode selected by a driver is not favorable from the viewpoint of use environment of the vehicle and operating feeling of the driver.

As a measure against the problem, during warm-up driving and reverse driving, a mode with an emphasis on output such as a power mode may be limited, but limitation on mode switching gives a sense of discomfort to the driver.

SUMMARY OF THE INVENTION

An object of the present invention is to provide a driving force control apparatus which can give a sense of security to a driver by enabling switching to a preferable mode even in an area where mode switching is limited in a vehicle capable of arbitrary selection from a plurality of control modes by a driver and prevent deterioration of exhaust emission even if the mode is switched so that favorable operability can be obtained.

The driving force control apparatus of a vehicle according to the present invention includes a memory unit configured to store a plurality of modes having different driving force characteristics, mode selection calculation portion configured to select a single mode from the above modes based on a request signal from an external operating unit and to output the selected mode as a request mode, a mode display calculation portion configured to set mode information corresponding to the request mode and to have the mode displayed on a mode display unit, a control mode arbitration calculation portion configured to set the mode corresponding to the request mode as control mode and to determine a mode limitation condition based on a driving condition parameter and to forcedly switch the control mode to a specified mode stored in the memory unit when the mode limitation condition is met, and a control calculation portion configured to calculate a driving force instruction value based on the driving force characteristic of the specific mode set at the mode arbitration calculation portion.

In this configuration, the mode information displayed on the mode display unit is set based on the request mode and the driving force instruction value is calculated based on the control mode, but since only the control mode is forcedly switched to the specific mode when the mode limitation condition is met, the request mode selected by the driver is displayed on the mode display unit. Therefore, switching to the driver's preferred control mode is possible even during warm-up driving or reverse driving, and a sense of security can be given to the driver. Also, since the driving force instruction value is forcedly switched to the specific mode, deterioration of exhaust emission is prevented and favorable operability can be obtained.

The above and other objects, features and advantages of the invention will become more clearly understood from the following description referring to the accompanying drawings.

BRIEF DESCRIPTION OF THE DRAWINGS

FIG. 6 is a configuration diagram of a driving force control apparatus of a vehicle;

FIG. 7 is a functional block diagram of the driving force control apparatus of a vehicle;

FIG. 15A is a conceptual diagram of a normal mode map;

FIG. 15B is a conceptual diagram of a save mode map; and

FIG. 15C is a conceptual diagram of a power mode map.

DETAILED DESCRIPTION OF THE PREFERRED EMBODIMENTS

Figure 1:
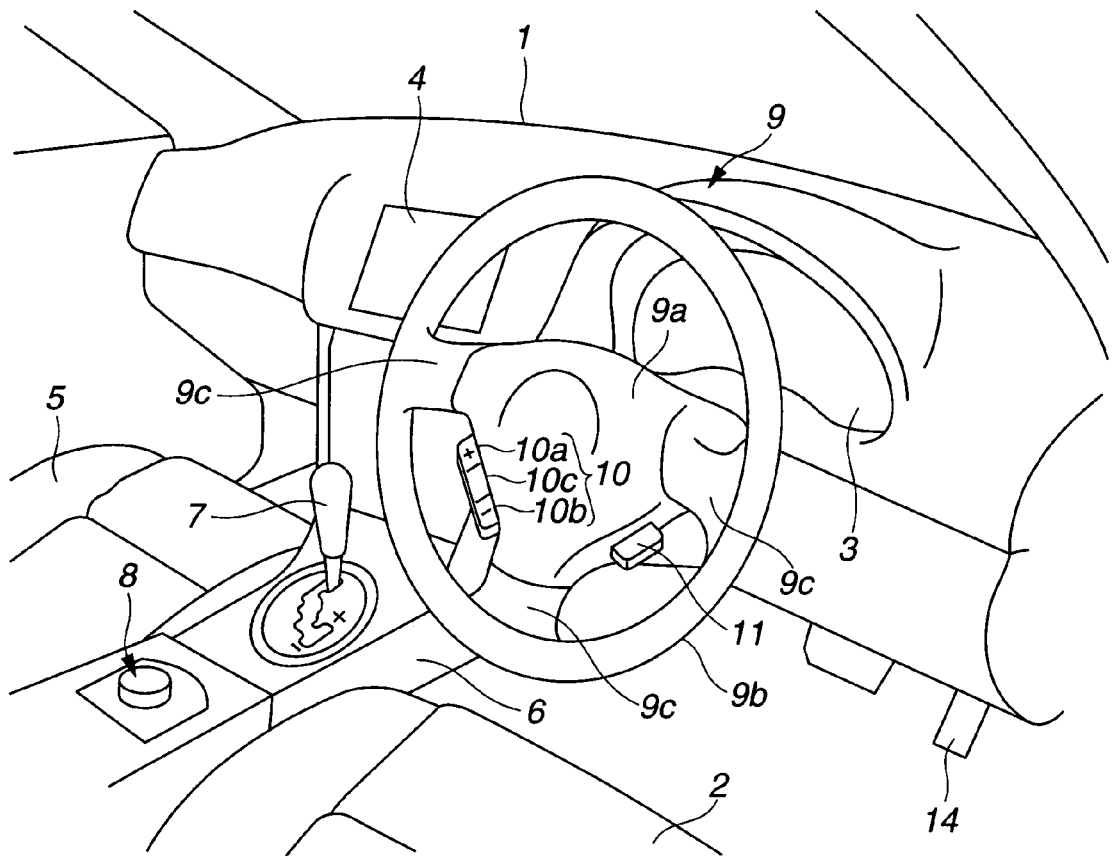
FIG. 1 is a perspective view of an instrument panel and a center console seen from a driver's seat side.

As shown in FIG. 1, an instrument panel 1 disposed on the front part in an interior of a vehicle cabin is extended right and left in the vehicle width direction, and a combination meter 3 is disposed on the instrument panel 1 located in front of a driver's seat 2. Also, at substantially the center in the vehicle width direction of the instrument panel 1, a center display 4 constituting a known car navigation system is disposed.

On a center console 6 disposed between a driver's seat 2 and a front passenger's seat 5 and extending to the rear of the car body from the instrument panel 1, a shift select lever 7 for selecting a range of an automatic transmission is disposed and in the rear thereof, a mode selection switch 8 as external operating unit configured to select output characteristic of an engine is disposed. Moreover, a steering wheel 9 is disposed in front of the driver's seat 2.

The steering wheel 9 has a center pad portion 9a which stores an air bag and the like, and the center pad portion 9a and a grip portion 9b on the outer circumference are connected by three spokes 9c at right and left and a lower part. A display switch 10 is disposed at a lower left part of the center pad portion 9a, and a temporary switch 11 as external operating unit is disposed at a lower right part.

Figure 2:
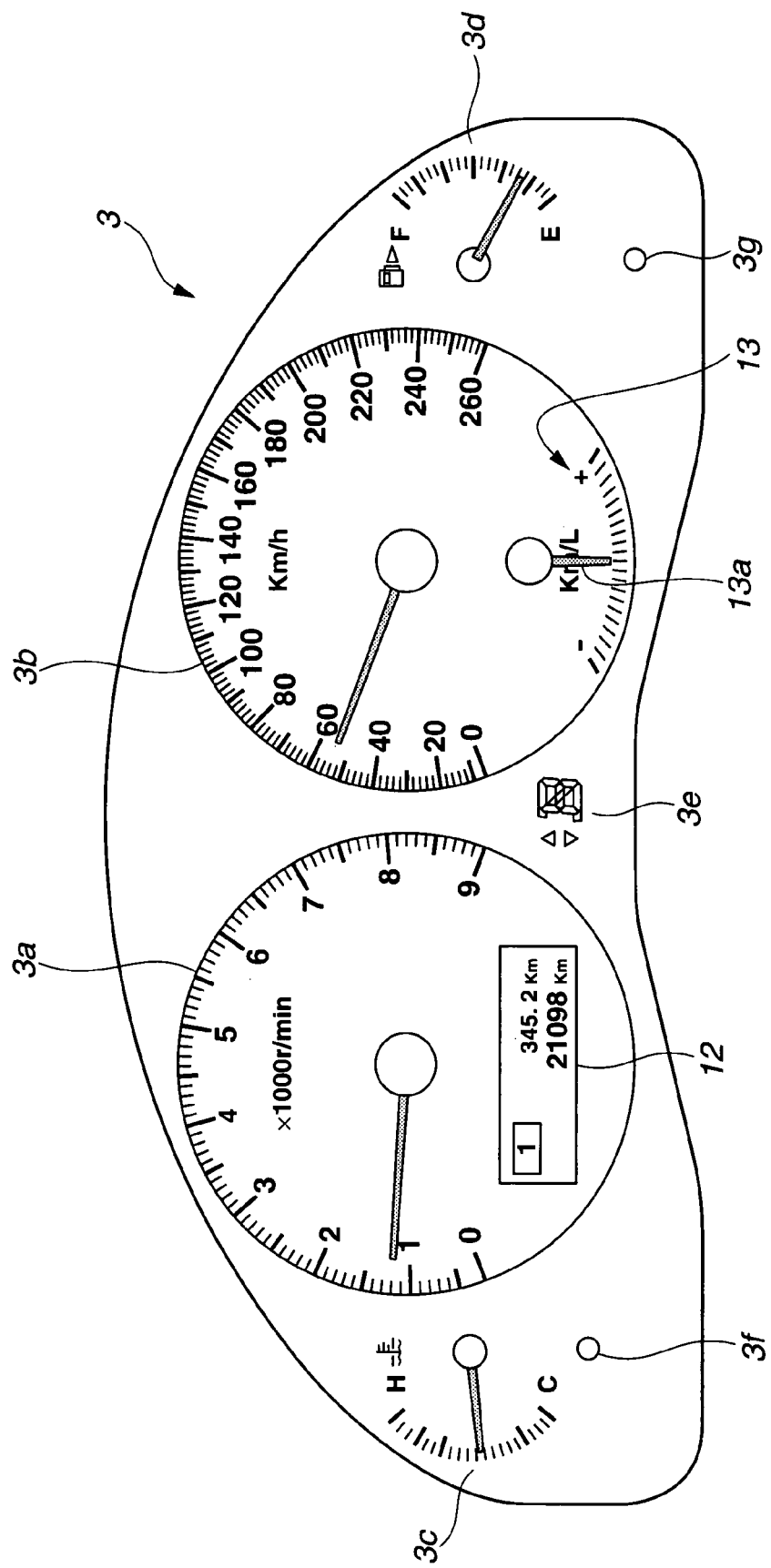
FIG. 2 is a front view of a combination meter.

Also, as shown in FIG. 2, the combination meter 3 has a tachometer 3a showing an engine speed and a speedometer 3b displaying a vehicle speed disposed, respectively, at right and left close to the center. Moreover, a coolant temperature meter 3c displaying a coolant temperature is disposed on the left of the tachometer 3a, and a fuel meter 3d displaying a remaining fuel amount is disposed on the right of the speedometer 3b. Also, a shift range display portion 3e displaying the current shift range is disposed at the center. Reference character 3f is a multi-information lamp (MIL), and reference character 3g is a trip reset switch which resets a trip meter. A push button of this trip reset switch 3g is projected toward the driver's seat 2 from the combination meter 3, and when the driver or the like holds the trip reset switch 3g ON for a set time and longer via the push button, the trip meter is reset.

Moreover, below the tachometer 3a, a multi-information display (hereinafter abbreviated as "MID") 12 is disposed which displays information such as driving distance, fuel economy performance, engine driving force, and control mode showing an engine output characteristic by switching a plurality of display screens. Also, below the speedometer 3b, a fuel economy performance meter 13 indexing economic driving based on a difference between instantaneous fuel economy performance and trip average fuel economy performance is disposed.

Figure 3:
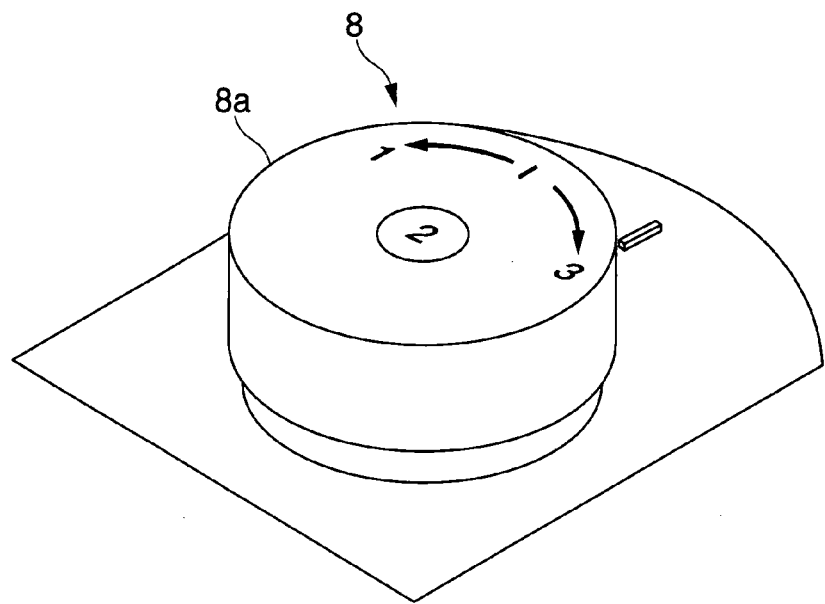
FIG. 3 is a perspective view of a mode selection switch.

As shown in FIG. 3, the mode selection switch is a shuttle switch also serving as a push switch, and when an external operator (since he/she is a driver in general, hereinafter referred to as "driver" in the description) operates a ring-like operation knob 8a, selection can be made from three types of control modes (normal mode m1, save mode m2, power mode m3), which will be described later. That is, in the present embodiment, by rotating the operation knob 8a to the left, a left switch is operated ON and the normal mode m1 is selected, and by rotating the knob to the right, a right switch is operated. ON and the power mode m3 is selected, while by pushing the operation knob 8a downward, a push switch is operated ON and the save mode m2 is selected. By allocating the save mode m2 to the push switch, even if the push switch is turned ON erroneously during driving, for example, since the save mode m2 has its output torque restricted as will be described later, even when the control mode is switched to the save mode m2, the driving force is not increased rapidly and the driver can drive the vehicle without anxiety.

The output characteristics of the modes m1 to m3 will be described in brief. The normal mode m1 is set so that the output torque is changed substantially linearly with respect to a stepped-on amount (accelerator opening degree) of an accelerator pedal 14 (See FIG. 15A) and this is a mode suitable for normal driving.

Also, the save mode m2 is set to a mode with a smooth output characteristic while ensuring a sufficient output in which an accelerator work can be enjoyed by restricting an engine torque and restricting an engine torque in synchronization with lockup control of a transmission in the case of a vehicle with an automatic transmission mounted. Moreover, since the output torque is restricted in the save mode m2, easy driving and low fuel economy performance (economy) can be both satisfied in good balance. Even with a vehicle with a 3-liter engine mounted, a smooth output characteristic is obtained while a sufficient output corresponding to a 2-liter engine is ensured, and performance with a particular emphasis on ease in handling in a practical region such as driving in a town is set.

The power mode m3 has an output characteristic with an excellent response from a low speed region to a high speed region of an engine, and moreover, the power mode m3 is set as a mode with an emphasis on power so that sporty driving state such as driving on a winding road can be actively supported for smart driving by changing a shift-up point in synchronization with an engine torque in the case of an automatic transmission mounted vehicle. That is, in this power mode m3, a high response performance is set for a stepped-on amount of the accelerator pedal 14, and in a vehicle with a 3-liter engine mounted, for example, setting is made that the maximum torque is generated at an early timing so that a potential of the 3-liter engine can be exerted to the maximum. A driving force instruction value (target torque) of each of the control modes (normal mode m1, save mode m2, power mode m3) is set based on two parameters of the engine speed and an accelerator opening-degree as request output detecting unit configured to detect a request output for the engine by a driver, as will be described later.

The display switch 10 is operated when information displayed on the MID 12 is to be switched, and a forward feeding switch portion 10a, a reverse feeding switch portion 10b, and an initial-screen return switch portion 10c are provided.

Figure 4:
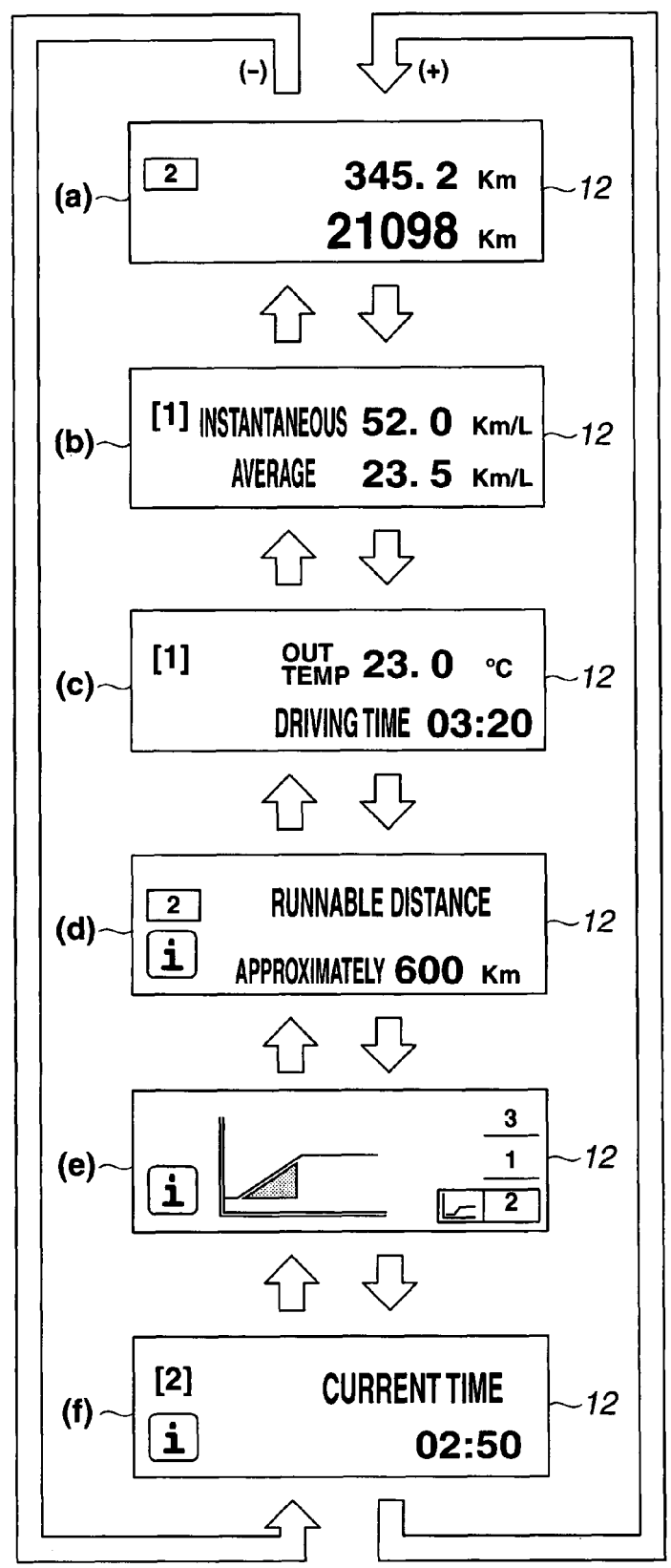
FIG. 4 is an explanatory view illustrating a display example of a multi-information display.

FIG. 4 shows items of each screen displayed on the MID 12. The MID 12 may be a color display. In the present embodiment, six types of images (a) to (f) are set, and every time the forward feeding switch portion 10a is turned ON, the screen is switched in the order of (a) to (f), and if the forward feeding switch portion 10a is turned ON when the screen (f) is displayed, the screen (a) is displayed. On the other hand, if the reverse feeding switch portion 10b is turned ON, the screen is switched in the reverse order. At a meter_ECU 21, which will be described later, a screen displayed immediately before an ignition switch is turned OFF is stored, and when the ignition switch is turned ON, the stored screen is displayed, and the screen is displayed as an initial screen on the MID 12.

The screen (a) displays a traveling distance, in which an odometer is displayed on a lower stage and a trip meter is displayed on an upper stage, and moreover, a current control mode ("2" indicating the save mode m2 in the figure) is displayed at the left end.

The screen (b) displays fuel economy performance, in which a trip average fuel economy performance [Km/L] calculated based on the traveling distance by the trip meter and a total fuel injection pulse width (pulse time) for the traveling distance is displayed on the lower stage and an instantaneous fuel economy performance [Km/L] calculated based on the traveling distance for several seconds and the total fuel injection pulse width (pulse time) at that time is displayed on the upper stage.

The screen (c) displays a driving time from when the ignition switch is turned ON or the engine is started on the lower stage and an outside air temperature [° C.] on the upper stage.

The screen (d) displays an approximate runnable distance [Km] calculated based on a remaining fuel amount in a fuel tank and the trip average fuel economy performance.

The screen (e) displays an accelerator-torque line in the currently selected control mode (the save mode m2 is displayed in the figure). The accelerator-torque line shows an engine output torque on the vertical axis and an accelerator opening-degree on the lateral axis, and a power display area P is set within the displayed accelerator-torque line. In the power display area P, a power level is linearly displayed from the left side to the right (increase) or from the right side to the left (decrease) in the figure in conjunction with the increase/decrease of the accelerator opening-degree. Therefore, the driver can easily grasp the current driving state by visually checking the displayed power level.

The screen (f) displays the current time.

Figure 5A:
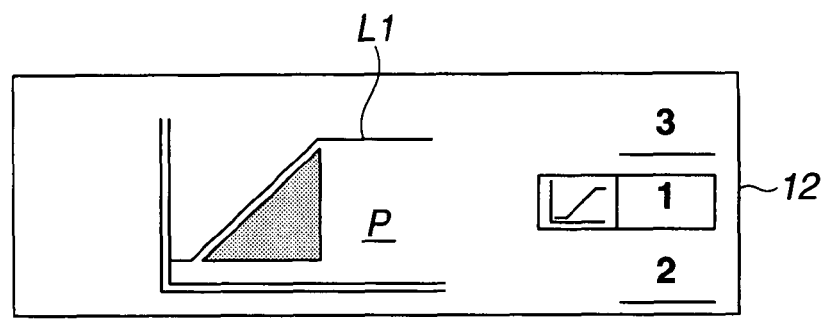
FIG. 5 is an explanatory view illustrating a display example of the multi-information display when a mode is switched.
Figure 5B:
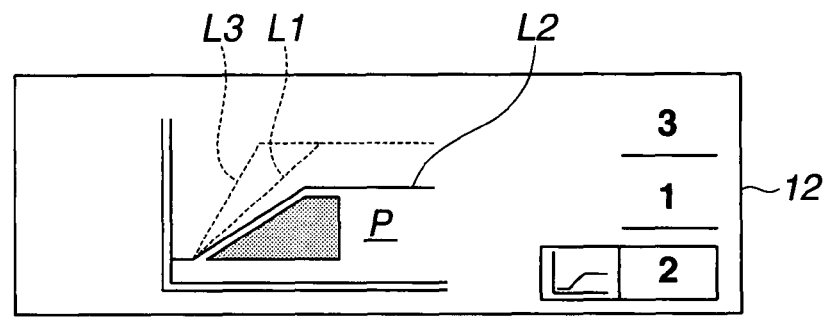
Figure 5C:
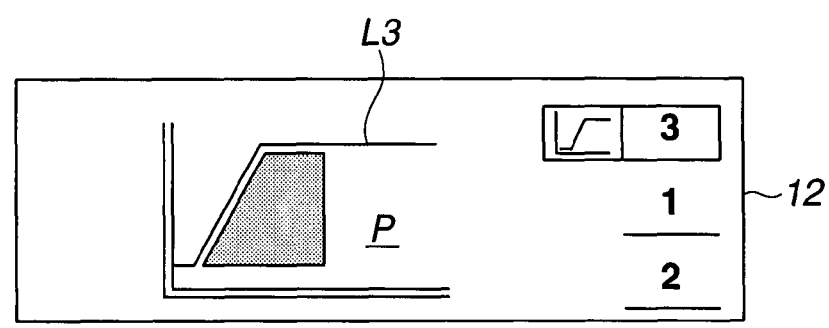

As shown in FIG. 5, the accelerator-torque line displayed on the above-mentioned screen (e) differs depending on a selected control mode (normal mode m1, save mode m2, power mode m3). FIG. 5A shows an accelerator-torque line L1 displayed when the normal mode m1 is selected, FIG. 5B shows an accelerator-torque line L2 displayed when the save mode m2 is selected, and FIG. 5C shows an accelerator-torque line L3 displayed when the power mode m3 is selected.

Suppose that the above-mentioned screen (e) in FIG. 4 is the final screen when the ignition switch is turned OFF, when the ignition switch is turned ON, the screen (e) is displayed as the initial screen. When the screen (e) is displayed as the initial screen, first, the accelerator-torque lines L1, L2, L3 are displayed at the same time, only the accelerator-torque line corresponding to the currently set control mode is displayed in bold with a given time delay, while the other accelerator-torque lines fade out. Such display processing is also carried out when the switch portions 10a to 10c are operated to display the screen (e).

FIG. 5B shows the accelerator-torque lines L1 and L3 in broken lines in an overlapping manner in order to compare the output characteristics of the accelerator-torque lines L1, L2 and L3 for each control mode. The accelerator-torque lines L1 and L3 are shown only for convenience and are not shown actually. As shown in FIG. 5B, the power mode m3 is of a characteristic that a throttle change amount is increased for the stepping on the accelerator pedal, and the target torque for the accelerator opening-degree is set larger. The normal mode m1 is set so that the throttle change amount is substantially linearly changed for the stepped-on amount of the accelerator pedal, and when compared with the output characteristic of the power mode m3, the normal mode m1 has a characteristic that the throttle change amount is relatively small for the stepping on the accelerator pedal, that is, a characteristic that an engine output is limited as compared with the power mode so that a favorable driving performance can be obtained in a normal driving region where the accelerator opening-degree is relatively small. The save mode m2 has a characteristic that the engine output is further limited than the normal mode m1, and an accelerator work can be enjoyed by restricting the output torque of the engine. The contents displayed on FIGS. 5A to 5C (screen (e) in FIG. 4) may be displayed all the time on an information display provided separately in the tachometer 3a. Alternatively, it may be so configured that only the display contents shown in FIGS. 5A to 5C are displayed on the MID 12, while the other display contents shown on each of the screens (a) to (f) in FIG. 4 are displayed on the information display provided separately.

The fuel economy performance meter 13 indicates a trip average fuel economy performance [Km/L] at a neutral position, and when the instantaneous fuel economy performance [Km/L] is larger than the trip average fuel economy performance [Km/L], a pointer 13a swings in a positive (+) direction according to the deviation, while if the instantaneous fuel economy performance [Km/L] is smaller than the trip average fuel economy performance [Km/L], the pointer 13a swings in a negative (−) direction according to the deviation.

As shown in FIG. 6, control apparatus which control a vehicle are connected capable of mutual communication such as a meter control device (meter_ECU) 21, an engine control device (E/G_ECU) 22, a transmission control device (T/M_ECU) 23, a navigation control device (Navi_ECU) 24 and the like through an onboard communication line 16 such as CAN (Controller Area Network) communication. Each of the ECU 21 to 24 is mainly comprised by a computer such as a microcomputer and has a nonvolatile memory unit or the like such as known CPU, ROM, RAM and EEPROM.

The meter_ECU 21 controls the entire display of the combination meter 3, and the mode selection switch 8, the display switch 10, the temporary switch 11 and a trip reset switch 3g are connected on the input side. On the output side, a combination meter driving portion 26 which drives instruments such as the tachometer 3a, the speedometer 3b, the coolant temperature meter 3c, and the fuel meter 3d and the MIL 3f, an MID driving portion 27 which displays/drives the MID 12, and a fuel economy performance meter driving portion 28 which drives the pointer 13a of the fuel economy performance meter 13 are connected. Also, in the nonvolatile memory unit provided at the meter_ECU 21, a request mode M_rqst (n−1) immediately before the ignition switch is turned OFF is stored.

The E/G_ECU 22 controls the entire engine, and sensors which detect the vehicle and engine driving state such as an engine speed sensor 29 as driving state detecting unit configured to detect an engine speed representing the engine driving state from rotation of a crank shaft or the like, an air flow sensor 30 which is disposed on the immediate downstream of an air cleaner and detects an air flow, an accelerator opening-degree sensor 31 which detects an accelerator opening-degree from a stepped-on amount of the accelerator pedal 14, a throttle opening-degree sensor 32 which detects an opening degree of a throttle valve (not shown) interposed in an intake passage and adjusting an air flow to be supplied to each cylinder of the engine, a coolant temperature sensor 33 which detects a coolant temperature indicating an engine temperature as a driving condition parameter and the like are connected to the input side. On the output side of the E/G_ECU 22, actuators which control engine driving are connected such as an injector 36 which injects a fuel weighed as predetermined for a combustion chamber of each cylinder, a throttle actuator 37 provided at an electronically controlled throttle device (not shown) and the like.

The T/M_ECU 23 carries out transmission control of an automatic transmission and control of a lockup actuator 44 which operates a lockup clutch, and a vehicle speed sensor 41 which detects a vehicle speed from a speed or the like of a transmission output shaft and an inhibitor switch 42 as a driving condition parameter which detects a range where the shift select lever 7 is set and the like are connected to the input side, while a control valve 43 for transmission control of the automatic transmission and the lockup actuator 44 are connected to the output side.

Next, functions of the meter_ECU 21, the E/G_ECU 22, and the T/M_ECU 23 will be described based on FIG. 7.

The meter_ECU 21 is provided with a mode selection calculation portion 21a and a mode display calculation portion 21b. The mode selection calculation portion 21a calculates a mode requested by a driver as well as a vehicle (request mode) M_rqst based on a mode request signal M_SW1 from the mode selection switch 8, a mode switching request signal M_SW2 from the temporary switch 11, a mode selection prohibition flag F_proh from a mode selection prohibition flag calculation portion 22d, an arbitration flag F_cyo from a display mode calculation portion, and a mode display signal M_disp, and the request mode M_rqst is outputted to a display mode arbitration calculation portion 22a of the E/G_ECU 22. The request mode M_rqst is basically the same as mode information selected by the driver via the mode selection switch 8 or the temporary switch 11 but may be different from the mode information selected by the driver depending on the vehicle state as will be described later.

On the other hand, the mode display calculation portion 21b outputs the mode information to the MID driving portion 27 based on the request mode M_rqst and has the information displayed on the MID 12 as the mode display unit.

The E/G_ECU 22 is provided with the display mode arbitration calculation portion 22a, a control mode arbitration calculation portion 22b, a throttle control calculation portion 22c and the mode selection prohibition flag calculation portion 22d.

The display mode arbitration calculation portion 22a calculates a display mode M_disp based on the request mode M_rqst from the mode selection calculation portion 21a and a coolant temperature Tw from the coolant temperature sensor 33 representing the engine temperature and outputs the display mode M_disp to the mode selection calculation portion 21a and the control mode arbitration calculation portion 22b. The display mode M_disp is the same as the request mode M_rqst from the mode selection calculation portion 21a at the normal time, but when the engine is in a high-temperature state and the display mode M_disp is set to the power mode m3, the mode is forcedly switched to the normal mode m1. In this fail-safe state, the request mode M_rqst is also forcedly switched by the display mode M_disp.

The control mode arbitration calculation portion 22b calculates a control mode signal M_cont based on the display mode M_disp from the display mode arbitration calculation portion 22a, the coolant temperature Tw, and a shift signal sift from the inhibitor switch 42 and outputs the control mode signal M_cont to a T/M control calculation portion 23a of the T/M_ECU 23. The control mode signal M_cont is the same as the display mode M_disp in the normal driving state, but when a mode limitation condition is examined and the mode limitation condition is satisfied, the control mode M_cont is forcedly switched to the normal mode m1. In the present embodiment, at a cold start when the coolant temperature is not higher than a predetermined value or the shift select lever 7 is in an R (reverse) range position, the mode limitation condition is satisfied.

The throttle control calculation portion 22c selects a mode map Mp1, Mp2 or Mp3 corresponding to the control mode M_cont set at the control mode arbitration calculation portion 22b, calculates a throttle opening-degree based on the selected mode map and outputs a throttle opening-degree signal corresponding to the throttle opening-degree to the throttle actuator 37 driving the throttle valve so as to control the opening degree of the throttle valve. Though not shown, the E/G_ECU 22 is provided with a fuel injection control calculation portion, and the fuel injection control calculation portion sets a fuel injection timing to the injector 36 and a fuel injection pulse width (pulse time) based on the detection signals inputted from the sensors.

Moreover, the mode selection prohibition flag calculation portion 22d calculates a mode selection prohibition flag F_proh based on the coolant temperature Tw from the coolant temperature sensor 33 and outputs the mode selection prohibition flag F_proh to the mode selection calculation portion 21a. During warming-up of the engine, the mode selection prohibition flag F_proh (F_proh=1) having the set value is outputted to the mode selection calculation portion 21a and selection of the power mode m3 is prohibited.

The above display mode arbitration calculation portion 22a, the control mode arbitration calculation portion 22b, and the mode selection prohibition flag calculation portion 22d are common in the point that they have a function to prohibit change of the control mode to a specific mode according to the request of the vehicle side or switching to a specific control mode regardless of the request by the driver. However, the display mode arbitration calculation portion 22a outputs the control mode different from the control mode based on the request once the request form the driver has been received. Therefore, both the request from the driver and the request on the vehicle side can be reflected in the mode display calculation portion 21b by a method, which will be described later. Also, the control mode arbitration calculation portion 22b can control only the control mode signal M_cont. Therefore, without changing the mode display signal M_disp, that is, without changing the display of the MID 12, only the control mode can be changed.

Also, the mode selection prohibition flag calculation portion 22d can prohibit the request itself from the driver. Therefore, even if the vehicle is in the normal state as warning-up, the input itself to the E/G_ECU can be prohibited for predetermined mode information in order to suppress exhaust emission. That is, the control mode arbitration calculation portion 22b and the mode selection prohibition flag calculation portion 22d are different from each other in the point that the control mode arbitration calculation portion 22b handles a case where the vehicle is in an abnormal state, while the mode selection prohibition flag calculation portion 22d handles a case where the vehicle is in the normal state.

A nonvolatile memory unit constituting a part of a driving force setting unit is provided at the E/G_ECU 22, and the nonvolatile memory unit stores a plurality of different output characteristics in the map form. As the output characteristics, three types of mode maps Mp1, Mp2, Mp3 are provided in the present embodiment, and as shown in FIGS. 15A to 15C, the mode maps Mp1, Mp2, Mp3 have an accelerator opening-degree and an engine speed as lattice axes and are constituted by a three-dimensional map, each storing basic target torques TRQ1, TRQ2, TRQ3 at each lattice point.

The mode maps Mp1, Mp2, MP3 are basically selected by operation of the mode selection switch 8. That is, when the normal mode m1 is selected by the mode selection switch 8, the normal mode map Mp1 is selected as the mode map, when the save mode m2 is selected, the save mode map Mp2 is selected, or when the power mode m3 is selected, the power mode map Mp3 is selected.

The output characteristics of the mode maps Mp1, Mp2, Mp3 will be described below. The normal mode map Mp1 shown in FIG. 15A is set to a characteristic that the basic target torque TRQ1 is linearly changed in a region where the accelerator opening-degree is relatively small and set so that the maximum torque is obtained in the vicinity of full-open of the throttle valve opening-degree.

In the save mode map Mp2 shown in FIG. 15B, as compared with the above-mentioned normal mode map Mp1, rise of the basic target torque TRQ2 is restricted, and even if the accelerator pedal 14 is fully stepped, an accelerator work such as stepping on the accelerator pedal 14 to the full extent or the like can be enjoyed by restricting the output torque. Moreover, since the rise of the basic target torque TRQ2 is restricted, both easy driving performance and low fuel economy performance can be satisfied with a good balance. Even in a vehicle on which a 3-liter engine is mounted, for example, a smooth output characteristic can be obtained while a sufficient output corresponding to a 2-liter engine is ensured, and a torque with a particular emphasis on ease in handling in a practical region such as driving in a town is set.

The power mode map Mp3 shown in FIG. 15C has a change rate of the basic target torque TRQ3 to the change in the accelerator opening-degree set to a large value over substantially the whole driving region. Therefore, for a vehicle having a 3-liter engine mounted, the basic target torque TRQ3 is set so that the potential of the 3-liter engine can be exerted to the maximum. An extremely low speed region including an idle speed of the mode maps Mp1, Mp2, Mp3 is set to substantially the same output characteristic.

According to the present embodiment as mentioned above, when the mode selection switch 8 is operated by a driver and any of the modes m1, m2, m3 is selected, the corresponding mode map Mp1, Mp2 or Mp3 is selected, and the basic target torque TRQ1, TRQ2, TRQ3 is set based on the mode map Mp1, Mp2 or Mp3, and thus, three types of totally different accelerator response can be enjoyed even in a single vehicle. The opening/closing speed of the throttle valve is also set so that it operates slowly in the save mode map Mp2 but quickly in the power mode map Mp3.

The T/M_ECU 23 is provided with the transmission control calculation portion 23a. The transmission control calculation portion 23a determines a range set by the shift select lever 7 based on a shift signal sift from the inhibitor switch 42, and when it is set to a D range, a shift pattern corresponding to the control mode M_cont set at the control mode arbitration calculation portion 22b is selected, and the transmission control is carried out by outputting the transmission signal to the control valve 43 according to the shift pattern. Alternatively, when the lockup condition is satisfied, a slip lockup signal or a lockup signal is outputted to the lockup actuator 44, and an input/output element of the torque converter is switched from a converter state to a slip lockup state or a lockup state.

The Navi_ECU 24 is provided at a known car navigation system and detects a position of a vehicle based on position data obtained from a GPS satellite or the like and calculates a guided path to a destination. And a current location and a guided path for the vehicle are displayed on map data on the center display 4. In the present embodiment, the center display 4 can display various kinds of information to be displayed on the MID 12.

Figure 8:
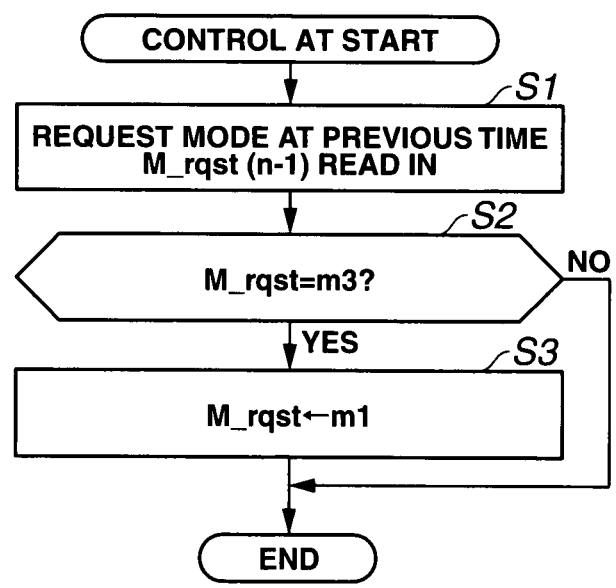
FIG. 8 is a flowchart illustrating a control routine at start.

Next, calculation processing executed by the mode selection calculation portion 21a of the above-mentioned meter_ECU 21 will be described according to a flowchart shown in FIGS. 8 and 9. A control routine at start shown in FIG. 8 is executed only once immediately after the ignition switch is turned ON.

In this routine, first, at Step S1, the request mode M_rqst (n−1) (M_rqst: normal mode m1, save mode m2, power mode m3) set till immediately before the ignition switch is turned OFF at the previous time is read in.

Then, at Step S2, it is determined whether the request mode M_rqst is the power mode m3 or not, and if it is the power mode m3, the routine goes to Step S3, where the request mode M_rqst is forcedly set to the normal mode m1 (M_rqst←m1), and the routine is finished.

Alternatively, if the request mode M_rqst is set to the normal mode m1 or the save mode m2 other than the power mode m3, the routine is finished here.

As mentioned above, when the request mode M_rqst when the ignition switch is turned OFF at the previous time is set to the power mode m3, the request mode M_rqst when the ignition switch is turned ON this time is forcedly switched to the normal mode m1, and thus, even if the driver steps on the accelerator pedal 14 slightly strongly after start, there would be no rapid start of the vehicle but a favorable starting performance can be obtained.

Figure 9:
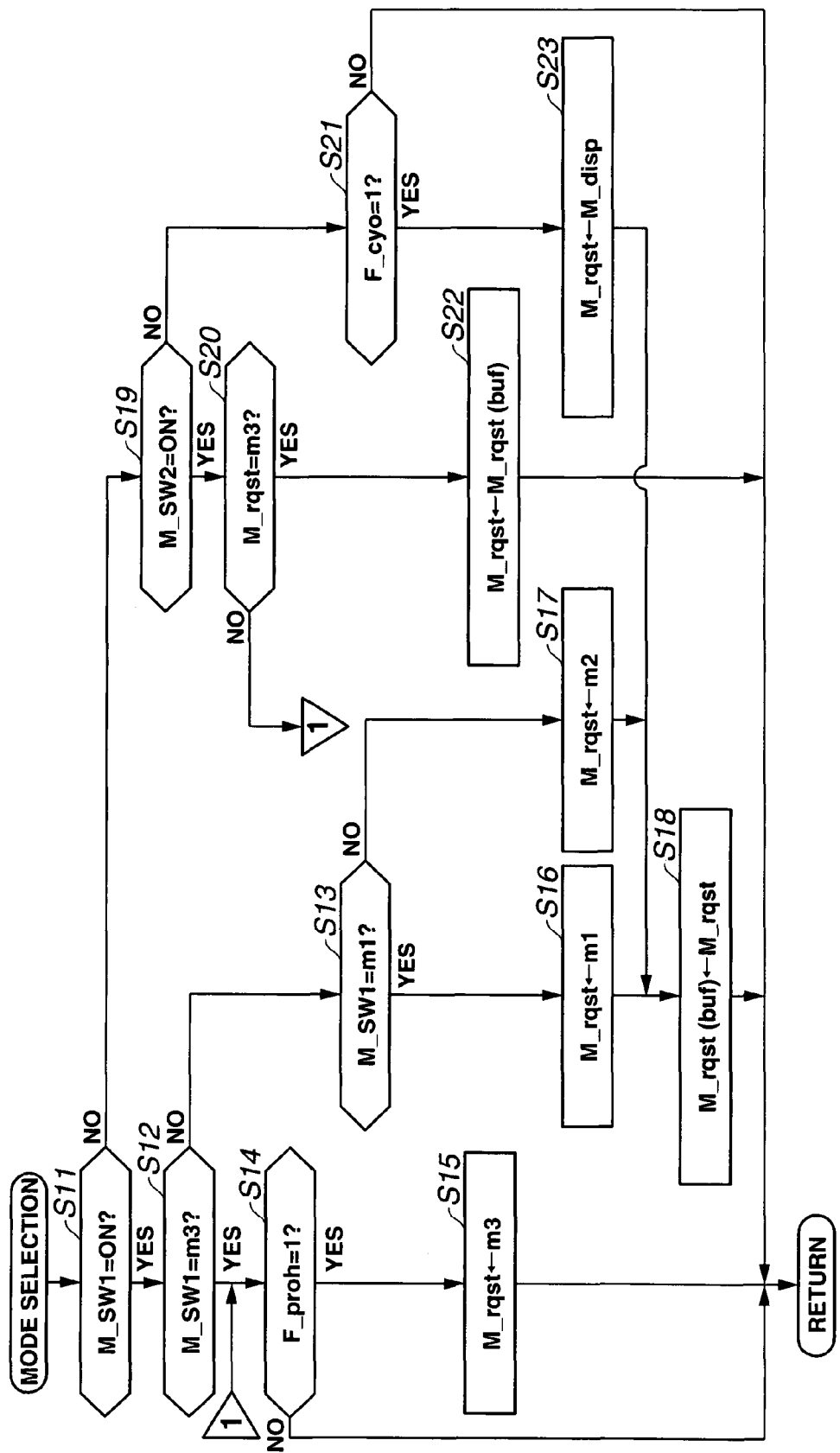
FIG. 9 is a flowchart illustrating a mode selection routine.

When the control routine at start is finished, the mode selection routine shown in FIG. 9 is executed every set calculation period. In this routine, first, at Step S11, it is determined if the mode request signal M_SW1 from the mode selection switch 8 is turned ON or not, that is, if there is a mode switching request from the driver, and if there is a request switching to ON, it is determined to which mode of the modes m1, m2, m3 the switching request is made based on the mode request signal M_SW1 at Steps S12, S13. Alternatively, if the mode request signal M_SW1 is OFF, that is, if there is no mode switching request, the routine jumps to Step S19.

In the following description, first, processing when the mode request signal M_SW1 is ON, that is, when there is a mode switching request will be described and then, processing when there is no mode switching request with the mode request signal M_SW1 being OFF will be described.

When it is determined that there is a mode switching request (M_SW1=ON) and the routine goes on to Step S12, to which control mode the switching request is made is determined based on the mode request signal M_SW1 at Steps S12, S13. As shown in FIG. 3, in the present embodiment, by rotating the operation knob 8a of the mode selection switch 8 to the right by the driver, the switching request to the power mode m3 is made, and by rotating the knob to the left, the switching request to the normal mode m1 is made. Moreover, by pressing the operation knob 8a downward, the switching request to the save mode m2 is made.

At Step S12, if it is determined to be the switching request to the power mode m3 with M_SW1=m3, the routine goes on to Step S14, where it is examined whether the mode selection prohibition flat F_proh is set or not. If the mode selection prohibition flag F_proh is set (F_proh=1), the routine goes on to Step S15, where the request mode M_rqst is set to the power mode m3 (M_rqst←m3), and the routine is exited. On the other hand, if the mode selection prohibition flag F_proh is not set (F_proh=0), the routine is exited as it is. The above mode selection prohibition flag F_proh is set or cleared in the mode selection prohibition routine shown in FIG. 10.

Figure 10:
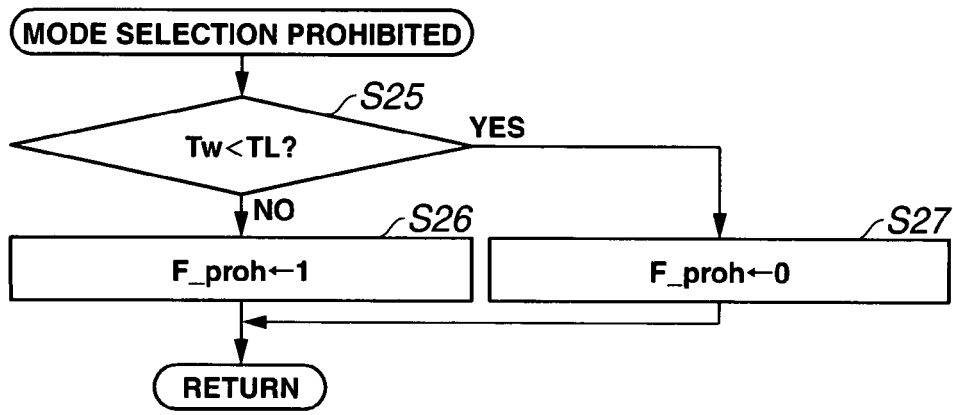
FIG. 10 is a flowchart illustrating a mode selection prohibition routine.

In the routine shown in FIG. 10, first, the coolant temperature Tw detected by the coolant temperature sensor 33 at Step S25 is read in and compared with a warming-up determination temperature TL (70 [° C.], for example). And if the coolant temperature Tw is not lower than the warming-up determination temperature TL (Tw≥TL), the routine goes on to Step S26, where the mode selection prohibition flag F_proh is set (F_proh←1), and the routine is exited. On the other hand, if the coolant temperature Tw is lower than the warming-up determination temperature TL (Tw<TL), the mode selection prohibition flag F_proh is cleared (F_proh←0), and the routine is exited. Therefore, during warming-up driving after start, even if the driver operates the mode selection switch 8 and selects the power mode m3, the request mode M_rqst is not set to the power mode m3 but an exhaust emission during the warming-up driving is suppressed.

Alternatively, at Step S12 in FIG. 9, if it is determined to be a switching request with M_SW1≠m3 to a mode other than the power mode, the routine branches to Step S13, where whether it is the switching request to the normal mode m1 with M_SW1=m1 or not is examined, and if it is determined to be the switching request to the normal mode m1 with M_SW1=m1, the routine goes to Step S16, where the request mode M_rqst is set to the normal mode m1 (M_rqst←m1), and the routine goes onto Step S18. On the other hand, in the case of M_SW1≠m1, it is the switching request to the save mode m2, and the routine branches to Step S17, where the request mode M_rqst is set to the save mode m2 (M_rqst←m2), and the routine goes on to Step S18.

When the routine goes on from Step S16 or Step S17 to Step S18, a temporary memory request mode M_rqst (buf) is set by the request mode M_rqst (M_rqst (buf)←M_rqst), and the routine is exited. The temporary memory request mode M_rqst (buf) is read in when the temporary switch 11 is turned ON while the request mode M_rqst is in the power mode m3.

On the other hand, if the mode request signal M_SW1 is determined to be OFF with no mode switching request and the routine jumps to Step S19, it is determined if there is a temporary switching request or not based on the mode switching request signal M_SW2 from the temporary switch 11, and if it is determined that there is a temporary switching request with M_SM2=ON, the routine goes on to Step S20, while if it is determined that there is no temporary switching request with M_SM2=OFF, the routine branches to Step S21.

At Step S20, it is determined if the current request mode M_rqst is in the power mode m3 or not, and if it is the power mode m3 (M_rqst=m3), the routine goes to Step S22, where the request mode M_rqst is set by the temporary memory request mode M_rqst (buf) (M_rqst←M_rqst (buf)), and the routine is exited. Therefore, if the driver turned ON the temporary switch 11 in the power mode m3 during driving and makes a temporary switching request, the request mode M_rqst is forcedly switched to the temporary memory request mode M_rqst (buf) set at Step S18.

On the other hand, if it is determined to be M_rqst≠m3 at Step S20, the routine returns to Step S14. Therefore, if the driver turned ON the temporary switch 11 during driving in the normal mode m1 or the save mode m2, the switching request of the request mode M_rqst is cancelled at Step S14 during warming-up driving (F_proh=1), and after the warming-up driving has been completed (F_proh=0), the request mode M_rqst is switched to the power mode m3 at Step S15.

Figure 11:
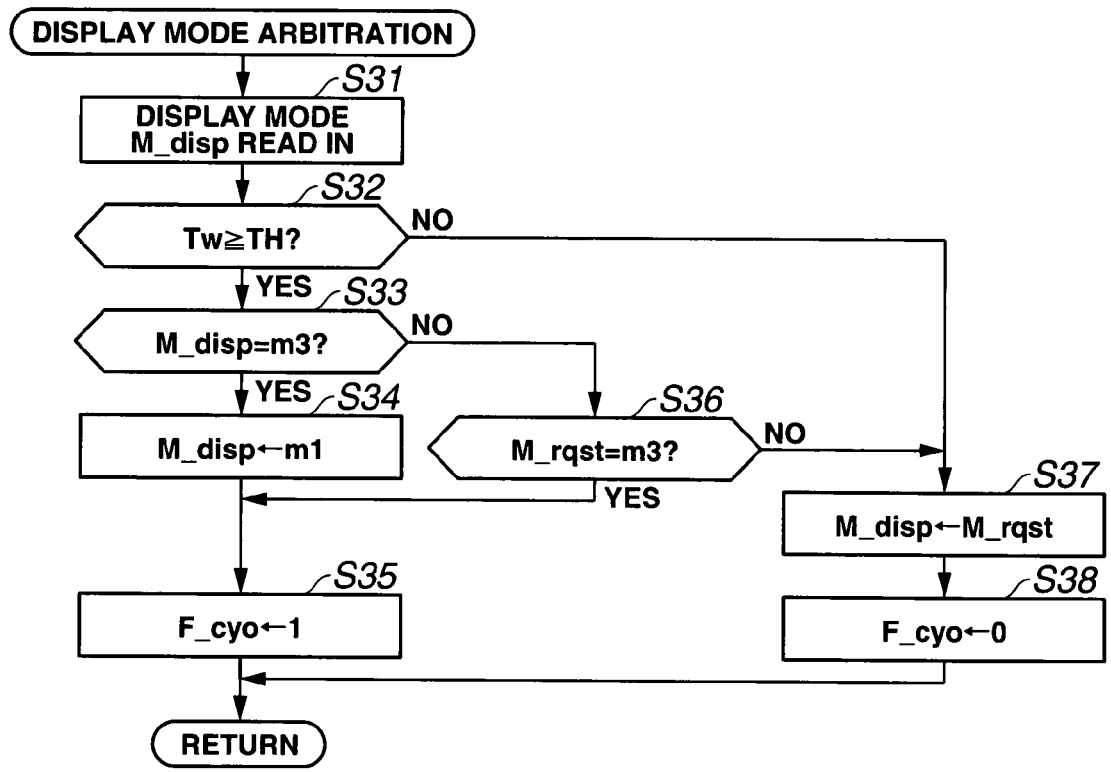
FIG. 11 is a flowchart illustrating a display mode arbitration routine.

If the routine branches from Step S19 to Step S21, it is determined if an arbitration flag F_cyo, which will be described later, is set or not, and if it is set (F_cyo=1), the routine goes on to Step S23, where the request mode M_rqst is set by a display mode M_disp (M_rqst←M_disp), and the routine goes on to Step S118. If the arbitration flag F_cyo is set (F_cyo=1) in this way, that is, if the engine temperature is considered high in the display mode arbitration routine shown in FIG. 11, which will be described later, the request mode M_rqst is forcedly switched by the display mode M_disp set by the display mode arbitration calculation portion 22a of the E/G_ECU 22 at the display mode arbitration routine shown in FIG. 11, which will be described later. An initial value of the arbitration flag F_cyo is set to 0.

Then, the request mode M_rqst set at the above-mentioned mode selection calculation portion 21a is outputted to the mode display calculation portion 21b. The mode display calculation portion 21b outputs mode information corresponding to the request mode M_rqst to the MID driving portion 27 to have the MID 12 display the mode information corresponding to the request mode M_rqst as shown in FIG. 5, for example. Therefore, in normal driving, since the mode information selected by the driver through operation of the mode selection switch 8 is displayed on the MID 12 immediately, favorable display response can be obtained. The arbitration flag F_cyo is set (F_cyo=1) when the mode information displayed on the MID 12 is forcedly switched, or the mode for which the driver makes a switching request is cancelled, and when F_cyo=1, a flash signal is outputted to the MIL 3f and the like through the MID driving portion 27 so that the MIL 3f and the like is flashed and the fact is notified that the control mode is forcedly switched or the mode requested by the driver is cancelled.

The above-mentioned arbitration flag F_cyo and the display mode M_disp are set at the display mode arbitration calculation portion 22a provided at the E/G_ECU 22. The setting of the arbitration flag F_cyo and the display mode M_disp executed at the display mode arbitration calculation portion 22a is specifically processed per predetermined calculation period according to the display mode arbitration routine shown in FIG. 11.

In this routine, first, at Step S31, the current display mode M_disp is read in or at Step S32, the coolant temperature Tw is compared with a high-temperature determination temperature TH (120 [° C.], for example) set in advance.

When the engine temperature is high at Tw≥TH, the routine goes on to Step S33 and failsafe processing is executed. In the case of Tw<TH, the routine jumps to Step S37.

When the routine goes on to Step S33, it is determined if the display mode M_disp is the power mode m3 or not, and if it is the power mode m3 (M_disp=m3), the routine goes on to Step S34, where the display mode M_disp is forcedly switched to the normal mode m1 (M_disp←m1), the arbitration flag F_cyo is set at Step S35 (F_cyo←1), and the routine is exited.

If the display mode M_disp is determined to be the normal mode m1 or the save mode m2 at Step S33 and the routine goes on to Step S36, it is determined if the request mode M_rqst is the power mode m3 or not, and if it is the power mode m3 (M_rqst=m3), the routine goes on to Step S35, where the arbitration flag F_cyo is set (F_cyo←1), and the routine is exited.

On the other hand, if the routine goes on from Step 32 to Step S37, the request mode M_rqst is set by the display mode M_disp (M_disp←M_rqst), the routine goes on to Step S38, where the arbitration flag F_cyo is cleared (F_cyo←0), and the routine is exited.

In this routine, if the engine temperature is considered high at Tw≥TH during driving in the power mode m3, for example, the display mode M_disp is forcedly switched to the normal mode m1 at Step S34, and the arbitration flag F_cyo is set at Step S35. And since the display mode M_disp at the subsequent routine execution is set to the normal mode m1, the routine branches to Step S36, if the request mode M_rqst is still set to the power mode m3 by the request from the driver, the arbitration flag F_cyo is set at Step S35.

The arbitration flag F_cyo is read in at Step S21 in FIG. 9 as mentioned above, and in the first routine where the arbitration flag F_cyo is set, the request mode M_rqst is set by the display mode M_disp. Therefore, in the routine after the arbitration flag F_cyo is set, it is M_rqst=m1, and then, the routine goes from Step S36 to Step S37 in FIG. 11, where the display mode M_disp is set by the request mode M_disp, and then, the arbitration flag F_cyo is cleared at Step S38.

As a result, even if the driver operates the mode selection switch 8 or the temporary switch 11 so as to set the request mode M_rqst to the power mode m3 when the engine temperature is considered high at Tw≥TH, switching to the power mode m3 is prohibited, and the request mode M_rqst is forcedly returned to the normal mode m1.

Figure 12:
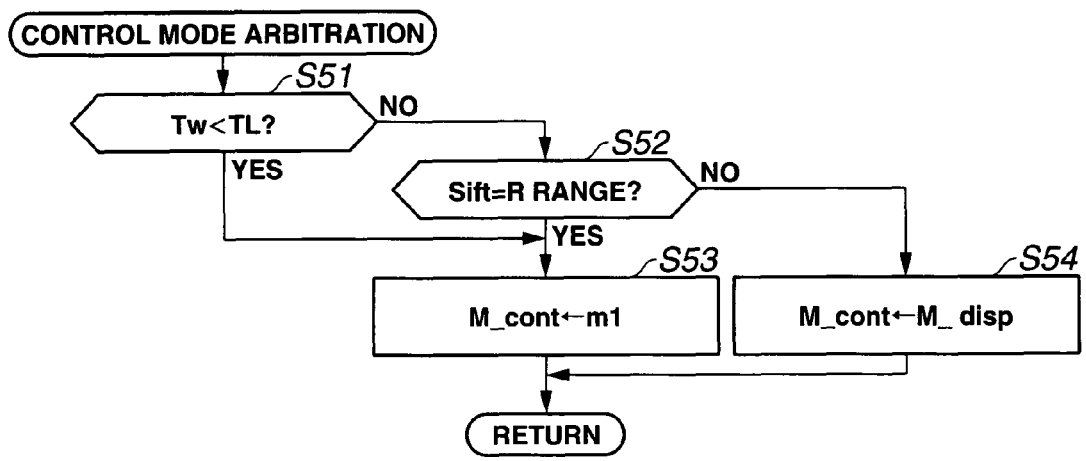
FIG. 12 is a flowchart illustrating a control mode arbitration routine.

The display mode M_disp set at the above-mentioned display mode arbitration calculation portion 22a is also read in at the control mode arbitration calculation portion 22b. Specifically, the arbitration of the control mode executed at the control mode arbitration calculation portion 22b is processed per predetermined calculation period according to the control mode arbitration routine shown in FIG. 12.

In this routine, first, at Step S51 and Step S52, a mode limitation condition is determined. That is, at Step S51, the coolant temperature Tw detected by the coolant temperature sensor 33 is compared with the warming-up determination temperature TL (70 [° C.], for example). Also, at Step S52, it is determined if the shift select lever 7 is set to the R (reverse) range or not based on the shift signal sift indicating the shift position of the shift select lever 7 outputted from the inhibitor switch 42.

And when the coolant temperature Tw is considered lower than the warming-up determination temperature TL (Tw<TL) and during warming-up driving at Step S51 or the shift select lever 7 is determined to be set to the R range at Step S52, it is determined that the mode limitation condition is satisfied, and the routine goes on to Step S53.

At Step S53, the control mode M_cont is forcedly switched to the normal mode m1 as a specific mode (M_cont←m1), and the routine is exited.

On the other hand, if the coolant temperature Tw is determined at Step S51 as above the warming-up determination temperature TL (Tw≥TH) after completion of warming-up driving and the shift select lever 7 is determined at Step S52 as being set to the range other than the R range, it is determined that the mode limitation condition is not satisfied, the routine goes on to Step S54, where the control mode M_cont is set by the display mode M_disp (M_cont←M_disp), and the routine is exited.

As mentioned above in the present embodiment, when the mode limitation condition is satisfied, the control mode M_cont is forcedly switched to the normal mode m1, and an exhaust emission is suppressed during the warming-up driving (TW<TL). Also, an accelerator feeling becomes constant at reverse driving, by which favorable operability can be obtained.

Particularly, since the driver turning back drives the vehicle at low speed while paying attention to the surroundings in the reverse driving and steering and accelerator operation are carried out at the same time, by making the accelerator feeling constant, a sense of timings of steering and accelerator operation becomes constant all the time in backing for parking, by which favorable operability can be obtained.

Even if the control mode M_cont is switched to the normal mode m1, since the M_rqst selected by the driver is displayed on the MID 12, the driver can determine that the mode requested by himself is reflected in the vehicle and feel secured.

In the present invention, when the mode limitation condition is satisfied, the control mode M_cont is uniformly switched to the normal mode m1 and then, the normal mode m1 also serves as the specific mode, but a specific mode having a mode map with a driving force characteristic different from the mode maps MP1, MP2 corresponding to the normal mode m1 and the save mode m2 may be provided separately so that the control mode is set by the specific mode. Alternatively, a mode map with a driving force characteristic different between the specific mode at warming-up driving and the specific mode when the shift select lever 7 is set to the R range may be set.

Since the control mode M_cont is read in only at the throttle control calculation portion 22c and the transmission control calculation portion 23a as will be described later but not at the above-mentioned meter_ECU 21, even if the control mode M_cont is forcedly switched to the normal mode m1, the mode information corresponding to the mode is not reflected or displayed on the MID 12. That is, the warming-up driving and reverse driving has a temporary event, and if the mode information to be displayed on the MID 12 is changed in correspondence with the actually changed control mode M_cont, the driver would have an impression that the requested mode is not reflected.

Therefore, when the driver operates, during warming-up driving, the mode selection switch 8 or the temporary switch 11 and switches the request mode M_rqst to the normal mode m1 or the save mode m2, for example, the display on the MID 12 is switched to the mode information indicating the modes m1, m2. Similarly, in the reverse driving after warming-up is completed, when the mode selection switch 8 or the temporary switch 11 is operated to switch the request mode M_rqst to any of the modes m1, m2, m3 while the shift select lever 7 is set to the R range, the MID 12 also displays the corresponding mode information.

The control mode M_cont set at the control mode arbitration calculation portion 22b is read in at the throttle control calculation portion 22c and the transmission control calculation portion 23a of the T/M_ECU 23.

Figure 13:
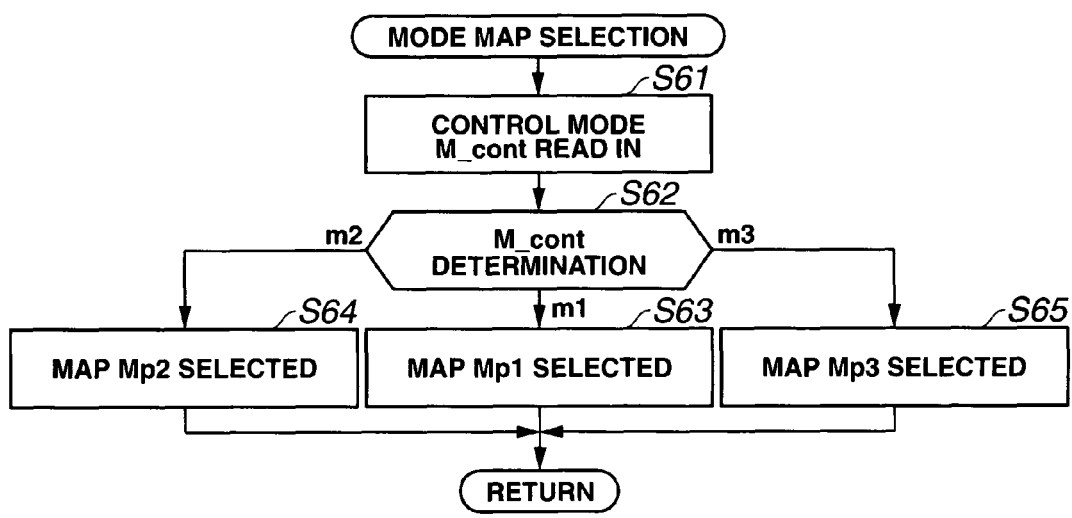
FIG. 13 is a flowchart illustrating a mode map selection routine.
Figure 14:
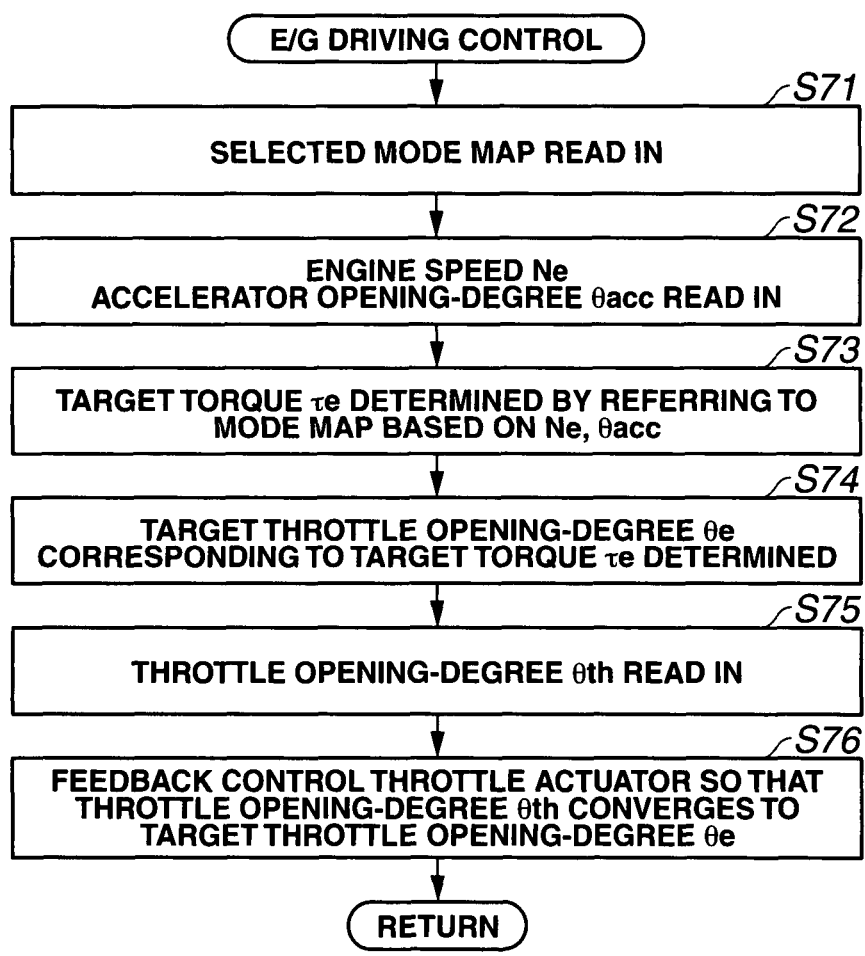
FIG. 14 is a flowchart illustrating an engine driving control routine.

Specifically, the engine control executed at the throttle control calculation portion 22c is processed per predetermined calculation period according to the mode map selection routine shown in FIG. 13 and the engine driving control routine shown in FIG. 14.

In the routine shown in FIG. 13, first, at Step S61, the control mode M_cont is read in and at Step S62, it is determined to which of the modes m1, m2, m3 the control mode M_cont is set.

If it is determined that the normal mode m1 of M_cont=m1 is set, the routine goes on to Step S63, the normal mode map Mp1 (See FIG. 15A) is selected and the routine is exited. If it is determined that the save mode m2 of M_cont=m2 is set, the routine goes on to Step S64, the save mode map Mp2 (See FIG. 15B) is selected and the routine is exited. If it is determined that the power mode m3 of M_cont=m3 is set, the routine goes on to Step S65, the power mode map Mp3 (See FIG. 15C) is selected and the routine is exited.

The mode map selected at the above-mentioned mode map selection routine is read at the engine driving control routine shown in FIG. 14. In this routine, first, the mode map (Mp1, Mp2 or Mp3; See FIG. 15) is read at Step S71 and at the subsequent Step S72, the engine speed Ne detected by the engine speed sensor 29 and an accelerator opening degree θacc [%] detected by the accelerator opening-degree sensor 31 are read. After that, the routine goes on to Step S73, where the mode map read at Step S71 based on the both parameters Ne and θacc is referred to with interpolation calculation and a target torque τe is determined. Then, the routine goes on to Step S74, where a target throttle opening degree θe corresponding to the target torque τe is determined.

After that, the routine goes on to Step S75, where the throttle opening degree θth detected by the throttle opening-degree sensor 32 is read, and at Step S76, the throttle actuator 37 which opens/closes the throttle valve provided at an electronic controlled throttle device is feedback-controlled so that the throttle opening degree θth is converged to the target throttle opening degree θe, and the routine is exited.

As a result, when the driver operates the accelerator pedal 14, with the accelerator opening degree θacc and the engine speed Ne as parameters, the throttle valve is opened/closed according to the mode map Mp1, Mp2, Mp3 corresponding to the request mode M_rqst (M: normal mode m1, save mode m2, power mode m3) selected by the driver, and if the control mode M_cont is set to the normal mode m1, the output torque is changed substantially linearly for the stepped-on amount of the accelerator pedal (accelerator opening degree θacc), and normal driving can be carried out.

If the save mode m2 is set, since rise of the target torque is restricted, not only that the accelerator work such as stepping on the accelerator pedal 14 to the full extent can be enjoyed but easy driving performance and low fuel economy performance can be both satisfied with a good balance. Therefore, even with a vehicle with a 3-liter engine mounted, a smooth driving can be performed while a sufficient output corresponding to a 2-liter engine is ensured, and favorable driving performance in a practical region such as driving in a town can be obtained. Moreover, if the power mode m3 is set, a high response can be obtained, and more sporty driving is enabled.

As a result, totally different three types of accelerator response can be enjoyed with a single vehicle. Therefore, the driver can be arbitrarily select a preferred output characteristic upon purchase of a single vehicle and can drive a vehicle having different characteristics of three vehicles.

When the mode limitation condition is met (during warming-up driving (Tw<TL) or the shift select lever 7 is set to the R range), the control mode M_cont is forcedly switched to the normal mode m1 and the engine and the transmission is controlled with the output characteristic by the normal mode m1, but the mode information displayed on the MID 12 is the mode information corresponding to the request mode selected by the driver, and thus, the driver can feel secured that the mode requested by himself is reflected. Even if the mode selection switch 8 or the temporary switch 11 is operated and the power mode m3 is selected during warming-up driving or while the shift select lever 7 is set to the R range, the information indicating the power mode m3 is displayed on the MID 12. And when the warming-up driving is completed or the shift select lever 7 is set to the D range, the control mode M_cont is set to the power mode m3 selected by the driver.

In the present embodiment, since the request mode M_rqst is forcedly switched to the display mode M_disp in the fail-safe state, the display on the MID 12 is switched at the same time as the switching of the request mode M_rqst. In this case, a predetermined delay time may be provided for the switching timing of the display on the MID 12. For example, the output timing of the arbitration flag F_cyo from the display mode arbitration calculation portion 22a is delayed to some extent from the output timing of the display mode M_disp from the display mode selection calculation portion 22a. And if both the display mode M_disp and the arbitration flag F_cyo are outputted from the display mode arbitration calculation portion 22a to the mode selection calculation portion 21a, the request mode M_rqst is changed to the display mode M_disp and the switched request mode M_rqst is outputted to the mode display calculation portion 21b.

Then, when the engine is in the high temperature state, if a driver operates the mode selection switch 8 and selects the power mode m3, the screen shown in FIG. 5C when the power mode m3 is selected is temporarily displayed on the MID 12, and after a predetermined delay time has elapsed, the screen is switched to the one shown in FIG. 5A when the normal mode m1 is selected. Therefore, the driver can recognize that the operation of the mode selection switch 8 is accepted and then, the mode is forcedly switched to the normal mode m1. As a result, the driver would not misrecognize that the power mode m3 can not be selected due to a defect of the mode selection switch 8 or the like.

Also, in the present embodiment, the warming-up determination temperature TL for warming-up determination at the control mode arbitration calculation portion 22b and the mode selection prohibition signal calculation portion 22d are the same, but not limited to this, the warming-up determination temperature at the mode selection prohibition signal calculation portion 22d may be set higher, the mode is fixed to the normal mode m1 at the beginning of the cold start and then, selection of the power mode m3 is prohibited, for example.

The present invention is not limited to the above-mentioned embodiment, but in the present embodiment, the throttle actuator 37 driving the throttle valve equipped at the electronic controlled throttle device is described as the control target, for example, but the control target is not limited to this, but an injector driving device may be a control target in a diesel engine, for example, so that a fuel injection amount injected from the injector driving device is set based on the target torque τe. Also, in an engine which opens/closes an intake valve by an electromagnetic valve mechanism, the electromagnetic valve mechanism may be the control target and the valve opening degree of the intake valve driven by the electromagnetic valve mechanism may be set based on the target torque τe.

The present invention may be applied to a case where the T/M_ECU 23 having a plurality of driving force characteristics is forcedly switched against the request by the driver. Moreover, when the control mode M_cont is forcedly switched against the request by the driver, the MIL 3f may be flashed.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A driving force control apparatus of a vehicle comprising:
a memory unit configured to store a plurality of modes comprising different driving force characteristics;
a mode selection calculation portion which selects a single mode from the plurality of modes based on a request signal from an external operation unit and outputs the selected mode as a request mode;
a mode display calculation portion which sets a mode information corresponding to the request mode and has a mode display unit display the mode information as the selected mode;
a control mode arbitration calculation portion which sets the mode corresponding to the request mode as a control mode, determines a mode limitation condition based on a driving condition parameter, and forcedly switches the control mode to a specific mode stored in the memory unit, the specific mode being different from the request mode, if the mode limitation condition is satisfied; and
a control calculation portion which calculates a driving force instruction value based on the driving force characteristic of the specific mode set at the mode arbitration calculation portion, wherein, when the control mode arbitration calculation portion switches the control mode to the specific mode, the mode display calculation portion causes the mode display unit to display the mode information corresponding to the request mode.

2. The driving force control apparatus of a vehicle according to claim 1, wherein the driving condition parameter comprises an engine temperature, and the control mode arbitration calculation portion determines that the mode limitation condition is satisfied if the engine temperature is not greater than a warming-up determination temperature.

3. The driving force control apparatus of a vehicle according to claim 1, wherein the driving condition parameter comprises a shift position, and the control mode arbitration calculation portion determines that the mode limitation condition is satisfied lithe shift position is set to a reverse range.

4. The driving force control apparatus of a vehicle according to claim 1, wherein the control mode stored in the memory unit comprises at least a first mode with a driving force characteristic suitable for normal driving and a second mode with a driving force characteristic with restricted power, and the specific mode also serves as the first mode.

5. The driving force control apparatus of a vehicle according to claim 4, wherein the driving force characteristic suitable for normal driving comprises a characteristic such that an output torque is changed substantially linearly with respect to a depression amount of an accelerator of the vehicle.

6. The driving force control apparatus of a vehicle according to claim 1, wherein the control mode stored in the memory unit comprises at least a first mode with a driving force characteristic suitable for normal driving and a third mode with a driving force characteristic with an emphasis on power, and the specific mode also serves as the first mode.

7. The driving force control apparatus of a vehicle according to claim 1, wherein the driving force characteristics comprise an accelerator opening-degree in relation to a target torque and an engine speed.

8. The driving force control apparatus of a vehicle according to claim 1, wherein the driving condition parameter comprises an engine temperature, and the control mode arbitration calculation portion determines that the mode limitation condition is satisfied lithe engine temperature is not less than a high-temperature determination temperature.

9. The driving force control apparatus of a vehicle according to claim 8, wherein the request mode is forced to the specific mode if the engine temperature is not less than the high-temperature determination temperature, and after a predetermined delay time has elapsed, the mode information comprises the control mode.

10. The driving force control apparatus of a vehicle according to claim 1, wherein, if the mode limitation condition is satisfied, then the mode information displayed by the mode display unit comprises the request mode.

11. The driving force control apparatus of a vehicle according to claim 1, wherein, if the mode limitation condition is satisfied, then the mode information displayed comprises the request mode, and after a predetermined delay time has elapsed the mode information displayed comprises the control mode.

12. The driving force control apparatus of a vehicle according to claim 1, wherein, before an ignition switch of the vehicle is turned off, the request mode is stored in a request mode storage memory.

13. The driving force control apparatus of a vehicle according to claim 12, wherein if an ignition switch of the vehicle is turned on, then the request mode is set from the request mode stored in the request mode storage memory.

14. The driving force control apparatus of a vehicle according to claim 1, wherein the mode information is depicted by the mode display unit as a mode in which the vehicle is currently operating.

15. A method of controlling a driving force of a vehicle comprising:
providing a drive force control apparatus which contains a plurality of modes having different driving force characteristics;
selecting a request mode from the plurality of modes with an external operation unit;
displaying the request mode on a mode display unit as a selected mode for operation;
setting a control mode to the request mode if a mode limitation condition is not met based on a driving condition parameter and setting the control mode to a specific mode, the specific mode being different from the request mode, if the mode limitation condition is met based on the driving condition parameter;
calculating a driving force instruction value based on the driving force characteristic of the set control mode; and
controlling the driving force based on the driving force instruction; and
if the mode limitation condition is satisfied, displaying the request mode on the mode display unit.

16. The method of controlling a driving force of a vehicle according to claim 15, wherein the driving condition parameter comprises an engine temperature, the mode limitation condition being satisfied if the engine temperature is not greater than a warming-up determination temperature.

17. The method of controlling a driving force of a vehicle according to claim 15, wherein the driving force characteristics comprise an accelerator opening-degree in relation to a target torque and an engine speed.

18. The method of controlling a driving force of a vehicle according to claim 15, wherein, if the mode limitation condition is satisfied, then the mode information displayed by the mode display unit comprises the request mode.

19. A driving force control apparatus of a vehicle comprising:
a memory unit configured to store a plurality of modes having different driving force characteristics;
a mode selection calculation portion which selects a single mode from the plurality of modes based on a request signal from an external operation unit and outputs the selected mode as a request mode;
a mode display calculation portion which sets a mode information corresponding to the request mode and has a mode display unit display the mode information as the selected mode;
a control mode arbitration calculation portion which determines a mode limitation condition based on a driving condition parameter and sets the mode corresponding to the request mode as a control mode if the mode limitation is not satisfied, and switches the control mode to a mode corresponding to a specific mode stored in the memory unit, the specific mode being different from the request mode, if the mode limitation condition is satisfied; and
a control calculation portion which calculates a driving force instruction value based on the driving force characteristic of the specific mode set at the mode arbitration calculation portion,
wherein, when the control mode arbitration calculation portion switches the control mode to the specific mode, the mode display unit displays the mode information corresponding to the request mode as a mode in which the vehicle is currently operating;

wherein the external operation unit comprises a mode selection switch and a temporary switch.

\* \* \* \* \*